(12) United States Patent
Jayaraman

(10) Patent No.: US 11,663,515 B2
(45) Date of Patent: May 30, 2023

(54) MACHINE LEARNING CLASSIFICATION WITH MODEL QUALITY PREDICTION

(71) Applicant: ServiceNow, Inc., Santa Clara, CA (US)

(72) Inventor: Baskar Jayaraman, Fremont, CA (US)

(73) Assignee: ServiceNow, Inc., Santa Clara, CA (US)

( * ) Notice: Subject to any disclaimer, the term of this patent is extended or adjusted under 35 U.S.C. 154(b) by 1330 days.

(21) Appl. No.: 16/059,700

(22) Filed: Aug. 9, 2018

(65) Prior Publication Data

US 2020/0050896 A1 Feb. 13, 2020

(51) Int. Cl.
*G06K 9/62* (2022.01)
*G06F 18/214* (2023.01)
*G06N 20/00* (2019.01)
*G06F 18/40* (2023.01)
*G06F 18/211* (2023.01)
*G06F 18/21* (2023.01)

(52) U.S. Cl.
CPC ........ *G06F 18/2148* (2023.01); *G06F 18/211* (2023.01); *G06F 18/217* (2023.01); *G06F 18/40* (2023.01); *G06N 20/00* (2019.01)

(58) Field of Classification Search
None
See application file for complete search history.

(56) References Cited

U.S. PATENT DOCUMENTS

| | | | |
|---|---|---|---|
| 6,609,122 B1 | 8/2003 | Ensor | |
| 7,028,301 B2 | 4/2006 | Ding | |
| 7,062,683 B2 | 6/2006 | Warpenburg | |
| 7,131,037 B1 | 10/2006 | LeFaive | |
| 7,170,864 B2 | 1/2007 | Matharu | |
| 7,610,512 B2 | 10/2009 | Gerber | |
| 7,617,073 B2 | 11/2009 | Trinon | |
| 7,689,628 B2 | 3/2010 | Garg | |
| 7,698,235 B2 | 4/2010 | Kuroiwa | |

(Continued)

OTHER PUBLICATIONS

Validation curves: plotting scores to evaluate models [retrieved from internet May 13, 2020—https://web.archive.org/web/20180730123625/https://scikit-learn.org/stable/modules/learning_curve.html . published Jul. 31, 2018 as per Wayback Machine].

(Continued)

*Primary Examiner* — Peet Dhillon
(74) *Attorney, Agent, or Firm* — Fletcher Yoder PC

(57) ABSTRACT

An embodiment may include a machine learning based classifier that maps input observations into respective categories and a database containing a corpus of training data for the classifier. The training data includes a plurality of entries, each entry having an observation respectively associated with a ground truth category thereof. A computing device may be configured to select, from the training data, a plurality of subsets each containing a different number of entries. The computing device may also be configured to, for each particular subset: (i) divide the particular subset into a training portion and a validation portion, (ii) train the classifier with the training portion, (iii) provide the validation portion as input to the classifier as trained, and (iv) based on how entries of the validation portion are mapped to the categories, determine a respective precision for the particular subset.

17 Claims, 12 Drawing Sheets

(56) References Cited

U.S. PATENT DOCUMENTS

| | | |
|---|---|---|
| 7,783,744 B2 | 8/2010 | Garg |
| 7,890,802 B2 | 2/2011 | Gerber |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,224,683 B2 | 7/2012 | Manos |
| 8,266,096 B2 | 9/2012 | Navarrete |
| 8,386,401 B2 | 2/2013 | Virkar |
| 8,457,928 B2 | 6/2013 | Dang |
| 8,478,569 B2 | 7/2013 | Scarpelli |
| 8,674,992 B2 | 3/2014 | Poston |
| 8,689,241 B2 | 4/2014 | Naik |
| 8,743,121 B2 | 6/2014 | De Peuter |
| 8,887,133 B2 | 11/2014 | Behnia |
| 8,977,620 B1* | 3/2015 | Buryak .............. G06F 16/353 707/758 |
| 9,239,857 B2 | 1/2016 | Trinon |
| 9,535,737 B2 | 1/2017 | Joy |
| 9,792,387 B2 | 10/2017 | George |
| 2008/0281764 A1 | 11/2008 | Baxter |
| 2015/0262077 A1* | 9/2015 | White ................ G06N 20/00 706/12 |
| 2016/0092794 A1* | 3/2016 | Qian ................. G06K 9/6256 706/12 |
| 2018/0060738 A1* | 3/2018 | Achin ................ G06N 20/00 |
| 2018/0144269 A1* | 5/2018 | Wilson ............... G06N 5/022 |
| 2018/0240131 A1* | 8/2018 | Denner .............. G06Q 50/01 |

OTHER PUBLICATIONS

Full Examination report for Australian Patent Application No. 2019213410 dated May 13, 2020; 6 pgs.

Office Action for Canadian Application No. 3,051,653 dated Nov. 6, 2020; 6 pgs.

Chu Carlton, et al.; "Does feature selection improve classification accuracy? Impact of sample size and feature selection on classification using anatomical magnetic resonance images", Neuroimage, vol. 60, No. 1, Mar. 1, 2012, pp. 59-70 (XP028897369).

G.M. Foody, et al.; "The effect of training set size and composition on artificial neural network classification"; Internationl Journal of Remote Sensing, vol. 16, No. 9, Jun. 1, 1995, pp. 1707-1723 (XP055652703).

Raschka, S.; "Model Evaluation, Model Selection, and Algorithm Selection in Machine Learning", arXiv.org. v2, pp. 1-49, Dec. 3, 2018 [retrieved from https://arxiv.org/abs/1811.12808v2 on Aug. 31, 2021].

Office Action for Canadian Application No. 3,051,653 dated Sep. 13, 2021; 5 pgs.

* cited by examiner

MACHINE LEARNING CLASSIFICATION WITH MODEL QUALITY PREDICTION

BACKGROUND

A machine learning based classifier predicts a category, from a discrete set of categories, to which an observation belongs. This classification is based on a training set of observations for which the ground truth category memberships are known. A popular example of a classifier is an email spam filter that classifies incoming email messages as either spam or not spam. Given a large and diverse enough training set, such a classifier can operate with high accuracy on new email messages.

SUMMARY

An open issue in machine learning is how to determine when enough data is available so that a model of sufficient quality can be trained. For instance, a machine learning classifier model can be trained with a relatively small set of data, but the results of operating this classifier may be poor. In general, the amount of data needed to train a model is highly sensitive to the type of model and the characteristics of the training data. Some simple classifiers, for example, may operate at an acceptable level of accuracy with just a few hundred units of training data, while others may require tens of thousands of units to achieve comparable performance.

On the other hand, increasing the amount of training data beyond a certain extent often does little to increase model quality. In other words, classifiers often have a point of diminishing returns with respect to the amount of training data used in their creation. But where this point of diminishing returns lies is also highly sensitive to the type of model and the characteristics of the training data.

Nonetheless, given this observation, it is desirable to identify an amount of training data such that: (i) the model, when trained with this amount of training data, achieves sufficiently high quality predictions, and (ii) increasing the training data used beyond this amount does not have a significant impact on the quality of these predictions. This latter goal is particularly desirable in situations where the time it takes to train a model is of concern. Since model training time generally increases with the amount of training data, it would be inefficient to train a model with more data than is necessary to achieve satisfactory results.

Accordingly, a first example embodiment may involve a machine learning based classifier that maps input observations into respective categories. The first example embodiment may also involve a database containing a corpus of training data for the classifier, where the corpus of training data includes a plurality of entries, each entry having an observation respectively associated with a ground truth category of the observation.

The first example embodiment may also involve a computing device configured to: select, from the corpus of training data, a plurality of subsets, each subset containing a different number of entries. The computing device may also be configured to, for each particular subset of the plurality of subsets: (i) divide the particular subset into a training portion and a validation portion, (ii) train the classifier with the training portion, (iii) provide the validation portion as input to the classifier as trained, and (iv) based on how entries of the validation portion are mapped to the categories, determine a respective precision for the particular subset. The computing device may also be configured to generate, for display on a graphical user interface of a client device, a representation of a graph that plots the number of entries in each of the plurality of subsets versus the respective precision for each of the plurality of subsets.

A second example embodiment may involve selecting, by a computing device, a plurality of subsets from a corpus of training data, where the corpus of training data includes a plurality of entries, each entry having an observation respectively associated with a ground truth category of the observation, and where each of the plurality of subsets contains a different number of entries. The second example embodiment may also involve, for each particular subset of the plurality of subsets, the computing device: (i) dividing the particular subset into a training portion and a validation portion, (ii) training a machine learning based classifier with the training portion, where the classifier maps input observations into respective categories, (iii) providing the validation portion as input to the classifier as trained, and (iv) based on how entries of the validation portion are mapped to the categories, determining a respective precision for the particular subset. The second example embodiment may also involve, based on the numbers of entries in the plurality of subsets and the respective precisions, recommending, by the computing device, a particular subset to use in training the classifier for a production environment In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
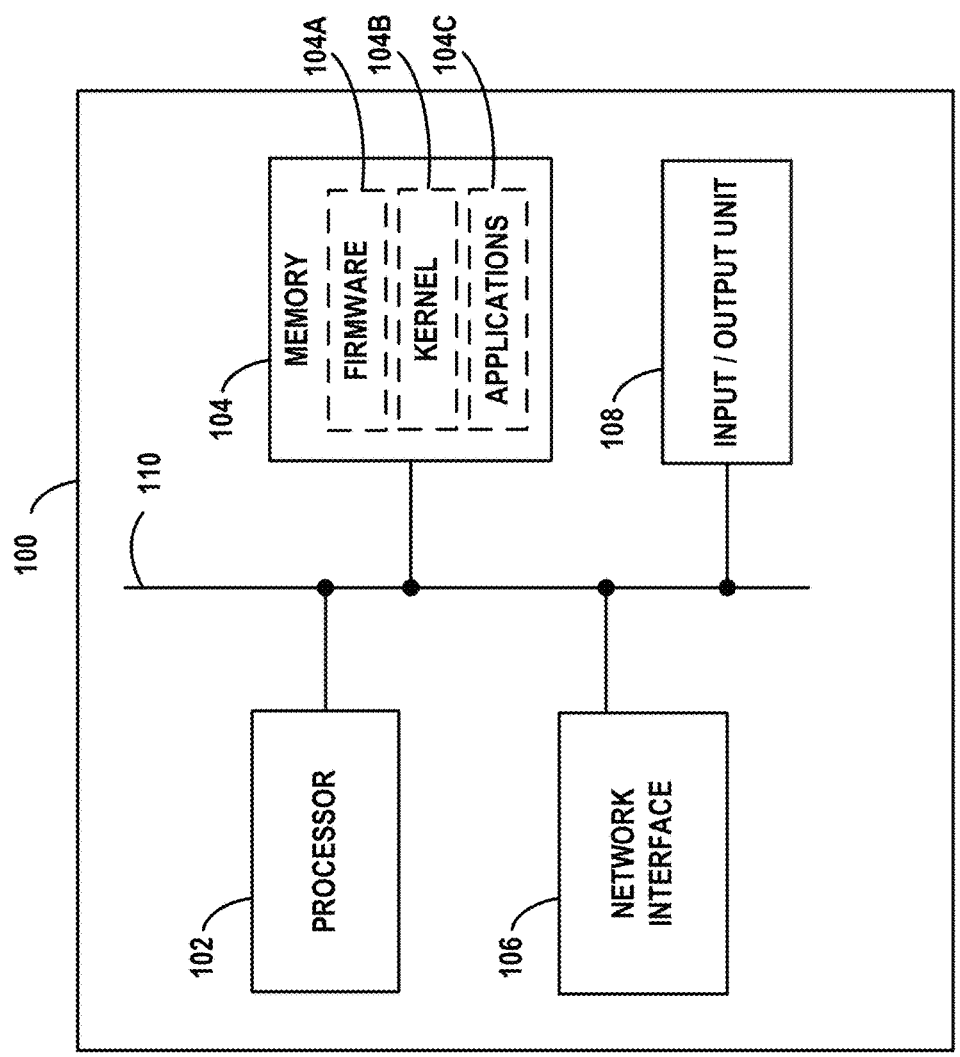
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of predefined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
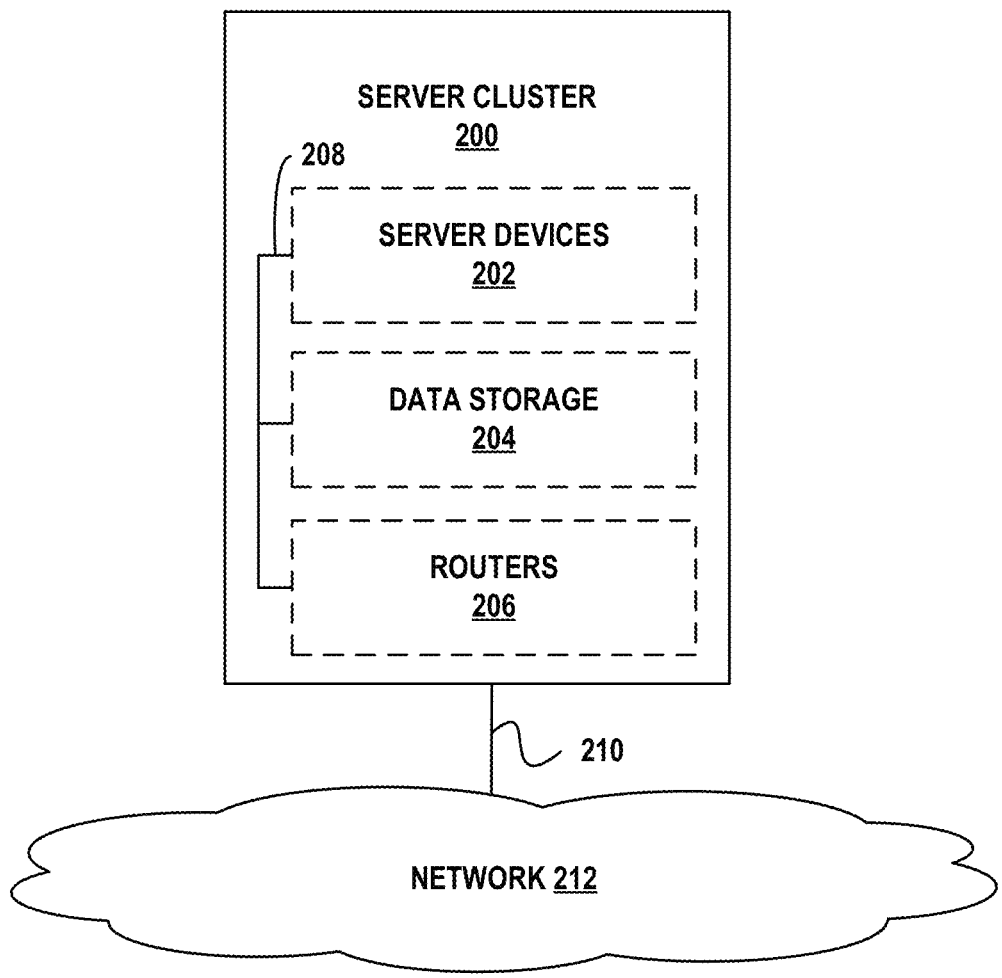
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
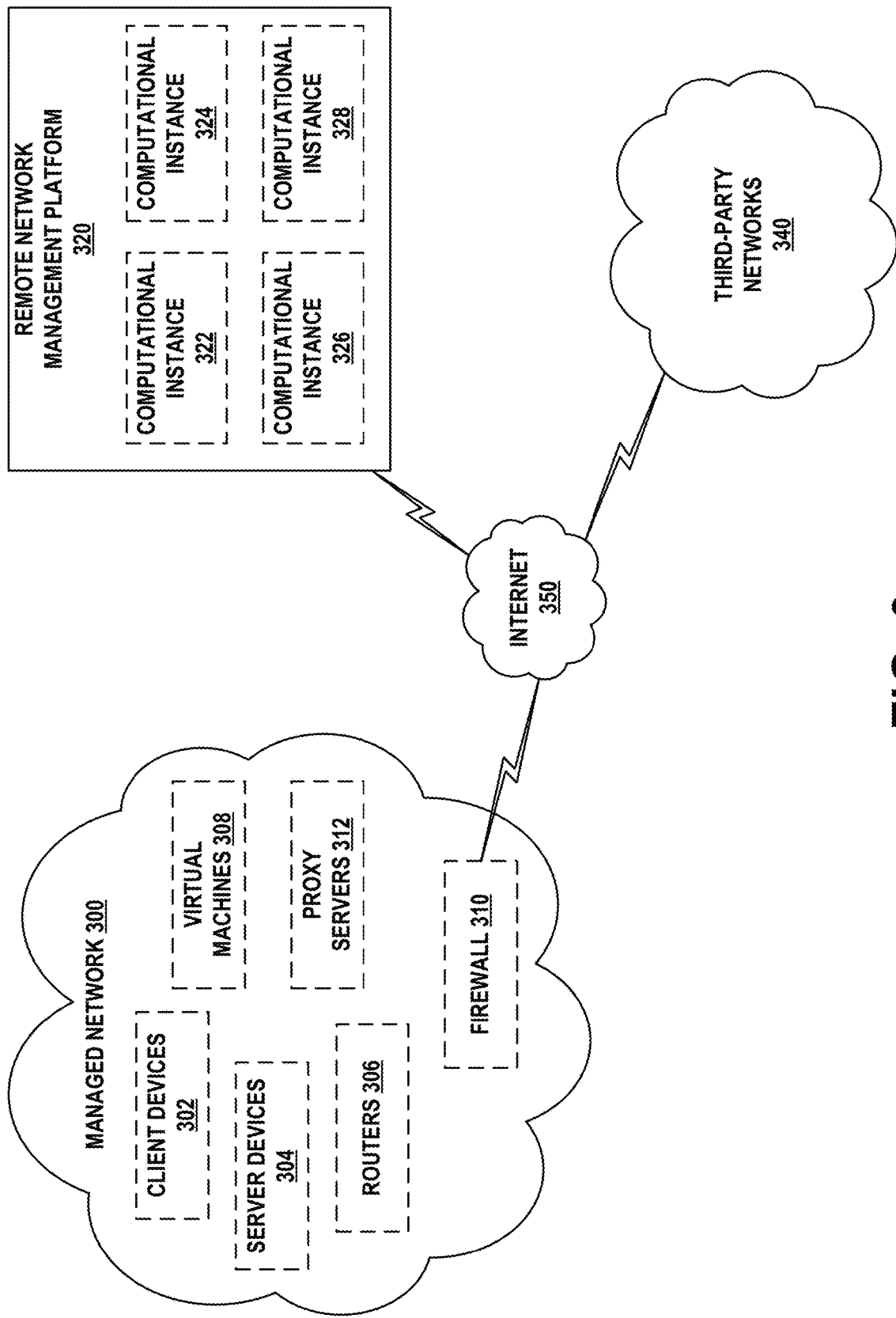
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation.

The multi-instance architecture of remote network management platform 320 is in contrast to conventional multi-tenant architectures, over which multi-instance architectures have several advantages. In multi-tenant architectures, data from different customers (e.g., enterprises) are commingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents commingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
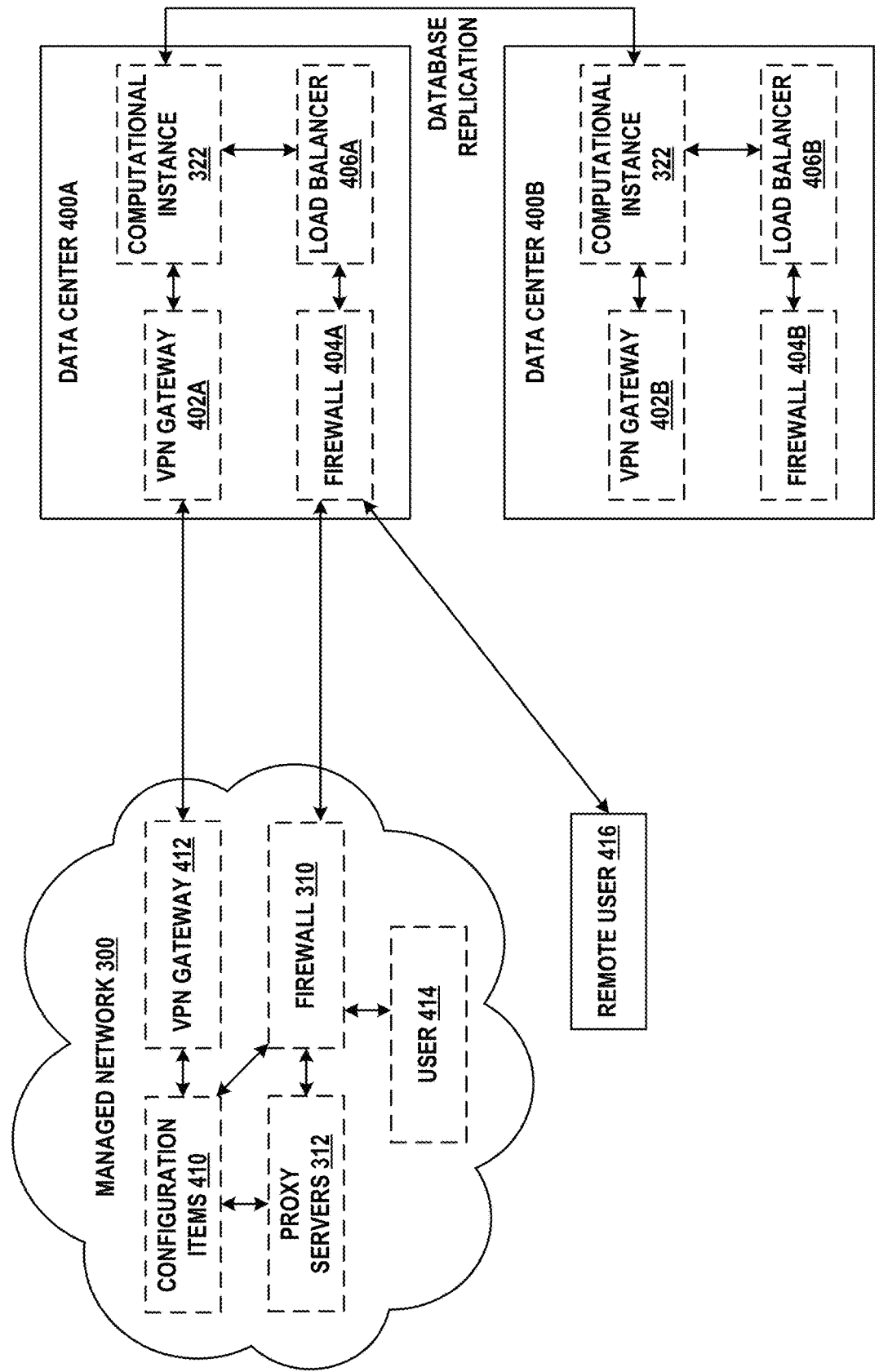
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
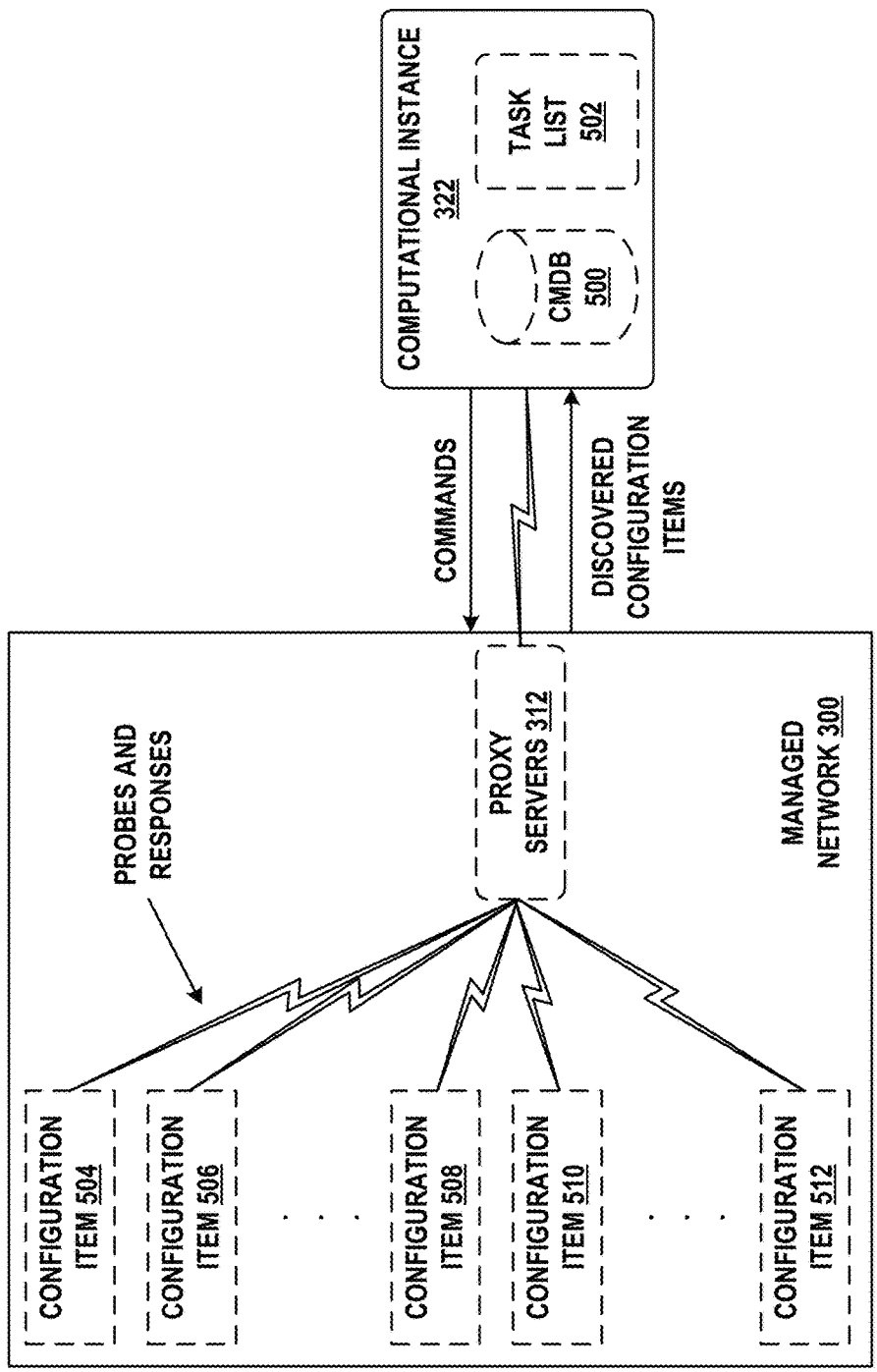
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
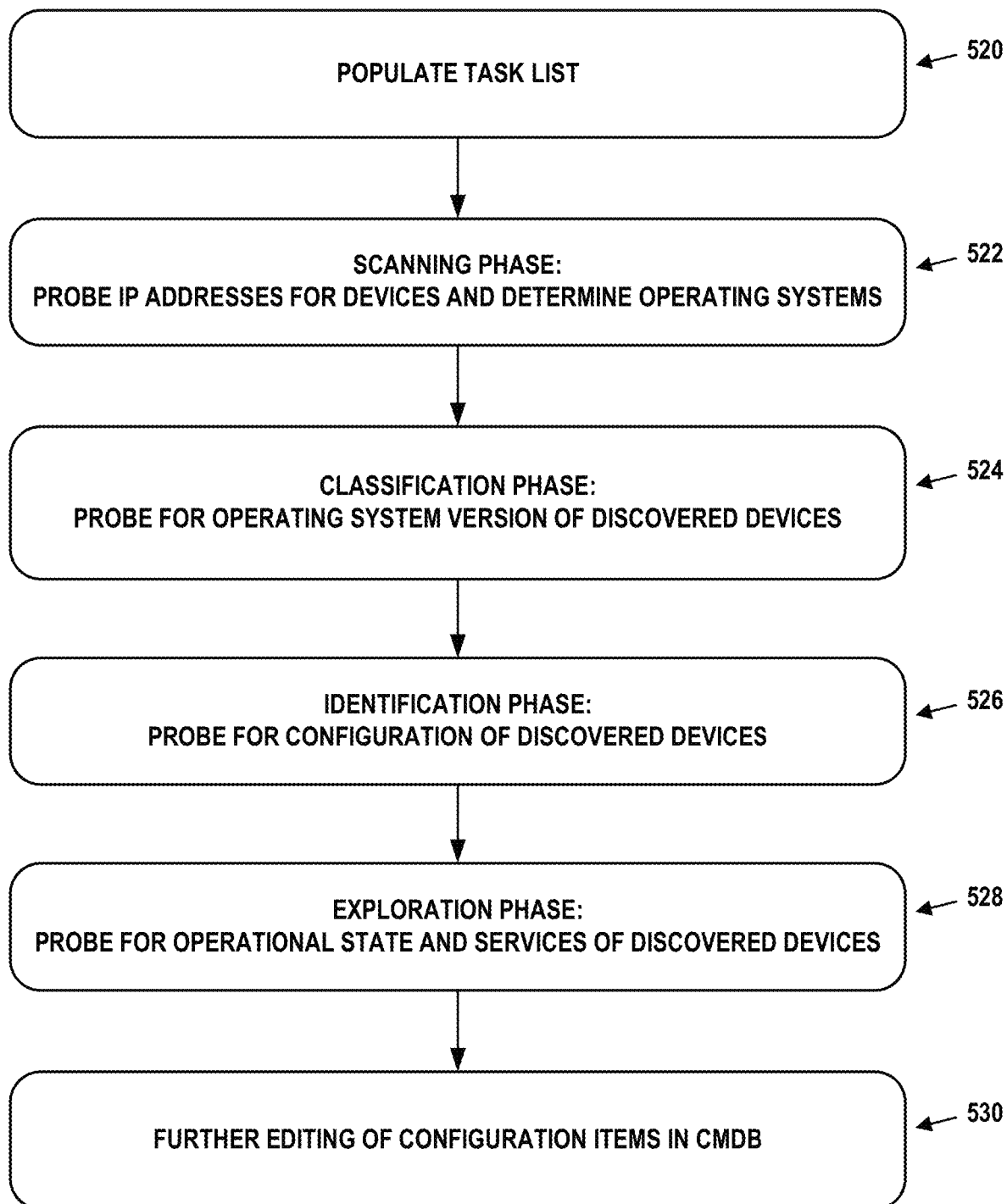
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. EXAMPLE MACHINE LEARNING MODELS

Generally, machine learning relates to the ability of computers to learn from and make predictions based on data. In practice, machine learning may include a process of providing a machine learning algorithm with training data to learn from, so as to create a machine learning model from this training data. The training data may include input values mapped to ground truth output values. Once the model is trained, it can predict the output values for new input values.

As described above, a classifier is a particular type of machine learning model that classifies observations (input values) into one or more of a number of categories (output values). A classifier can be trained by providing a training data set including observations mapped to ground truth categories thereof. With enough training data, the classifier can be expected to make reasonably accurate predictions of the categories of new observations.

Examples of machine learning classifiers include Bayesian classifiers, support vector machines, linear classifiers, k-nearest-neighbor classifiers, decision trees, random forests, and neural networks. Other types of classifiers may be possible.

A. Use of a Machine Learning Classifier

For purpose of example, suppose that an enterprise's IT department employs a classifier to help it determine the categories of IT help desk trouble tickets. These tickets may be opened by technology users who are having difficulties with hardware, software, or networking services. Each ticket may include a short text field (e.g., 1000 characters or less) containing a description of the problem in the words of the user who opened the ticket.

A challenge for a large enterprise is to properly sort open tickets into categories. Certain types of categories, such as security-related problems or wide-spread service outages are likely to be more important for the enterprise to address quickly than problems related to setting up an email account or deciding which web browser to use. Furthermore, users cannot be relied upon to self-categorize their problems reliably. What looks like a certain category of problem to a user might actually be of a different category. Or, a user may have no idea to which category his or her problem belongs, and therefore may decline to specify any category.

An IT department may receive hundreds or thousands of tickets per day. Thus, it is desirable for these tickets to be categorized rapidly and accurately. One way of addressing this problem to is employ a machine learning classifier.

In order to make the examples herein tractable and illustrative, the following assumes that there are only two categories in which the text fields of trouble tickets can be classified: email and VPN. In reality, there may be a number of additional categories for trouble tickets, such as authentication, backup, chat, database, hardware, Internet access, mobile, network, user interface, and so on. The concepts behind the simple binary classifier used herein can easily be extended to any number of categories.

TABLE 1

| Text Field | Ground Truth Category |
|---|---|
| "My email signature does not have the company logo." | Email |
| "Outgoing messages not working." | Email |
| "Forgot my secure access password." | VPN |
| "Can't add members to department's mailing list." | Email |
| "VPN dropping every few minutes." | VPN |
| "Getting authentication failure when trying to access work from home." | VPN |
| "Two factor authentication not working." | VPN |
| "Messages stuck in outbox." | Email |
| "Slow data rates when logged into corporate network." | VPN |
| "VPN client crashing." | VPN |

Table 1 provides examples of text fields from trouble tickets categorized as either email issues or VPN issues. These trouble tickets may represent historical data going back hours, days, months or years. Here, it is assumed that the ground truth categories are known. These ground truth categories can be manually entered by IT professionals either from a reading of the text fields, after each trouble ticket has been resolved and its root cause has been identified, or in some other fashion.

In any event, a large data set similar to that of Table 1 (e.g., with hundreds or thousands of observations) may be gathered. Since the data set maps input values to ground truth output values, it can be used to train a classifier. This training may take place in a number of ways and in accordance with a number of algorithms. For instance, and without getting into the finer details of training, a classifier may be trained to look for certain keywords or keyphrases that are indicative of either email or VPN issues. For example, the keywords "email", "outbox", "messages", and "mailing" may be indicative of email issues, while the keywords "password", "authentication", "VPN", and "network" may be indicative of VPN issues. Nonetheless, more sophisticated categorization techniques may be learned by a classifier.

One way of gaining insight into the efficacy of a classifier is to examine its performance on new observations for which the ground truth classification is known. This can be accomplished by splitting a training data set into two parts. One part (e.g., 80%) can be used for the actual training, while the other part (e.g., the remaining 20%) can be used for evaluation. Since the part used for evaluation includes ground truth output values, the expected future performance of the classifier can be determined. Such a process may be referred to as cross-validation.

It may be implied that classifiers output just one predicted category for each new observation. However, this need not be the case. Some classifiers may instead output a probability that the new observation falls into each of the possible categories. As an example of the latter, the trouble ticket classifier may output respective predicted probabilities that each text field relates to email issues and VPN issues.

TABLE 2

| Text Fields | Email Probability | VPN Probability |
|---|---|---|
| Text field 1 | 60% | 40% |
| Text field 2 | 10% | 90% |
| Text field 3 | 73% | 27% |

Table 2 illustrates a simple example of the output of such a classifier. For the observation "text field 1", the classifier predicts that the trouble ticket is related to email issues with 60% probability and to VPN issues with 40% probability. Similarly, for the observation "text field 2", the classifier predicts that the trouble ticket is related to email issues with 10% probability and to VPN issues with 90% probability. Likewise, for the observation "text field 3", the classifier predicts that the trouble ticket is related to email issues with 73% probability and to VPN issues with 27% probability.

B. Model Quality Determination

One way of estimating the quality of a model is by calculating its precision. The precision of a model is the percentage of observations, out of all observations predicted to be in a particular category, that are actually in the particular category. For instance, if a model correctly classifies 150 out of 170 observations, the model's precision is 150/170=88.2%. Clearly, it is desirable for precision to be as high as possible. Nonetheless, it is unusual for precision to be 100% for any model due to the naturally occurring noise in most real-world data sets.

It is possible to evaluate model quality based on a combination of these metrics (e.g., a weighted average of precision and other metrics). Nonetheless, other metrics may be used.

VI. EVALUATING MODEL QUALITY BASED ON TRAINING DATA QUANTITY

In general, the amount of data needed to train a machine learning model, such as a classifier, is highly sensitive to the type of classifier and the characteristics of the training data. Some simple classifiers, for example, may operate at an acceptable level of precision with just a few hundred units of training data, while others may require tens of thousands of units to achieve comparable performance. But increasing the amount of training data beyond a certain point might not significantly increase model quality. In other words, classifiers often have a point of diminishing returns with respect to the amount of training data used in their creation. But where this point of diminishing returns lies is also highly sensitive to the type of classifier and the characteristics of the training data.

Figure 6:
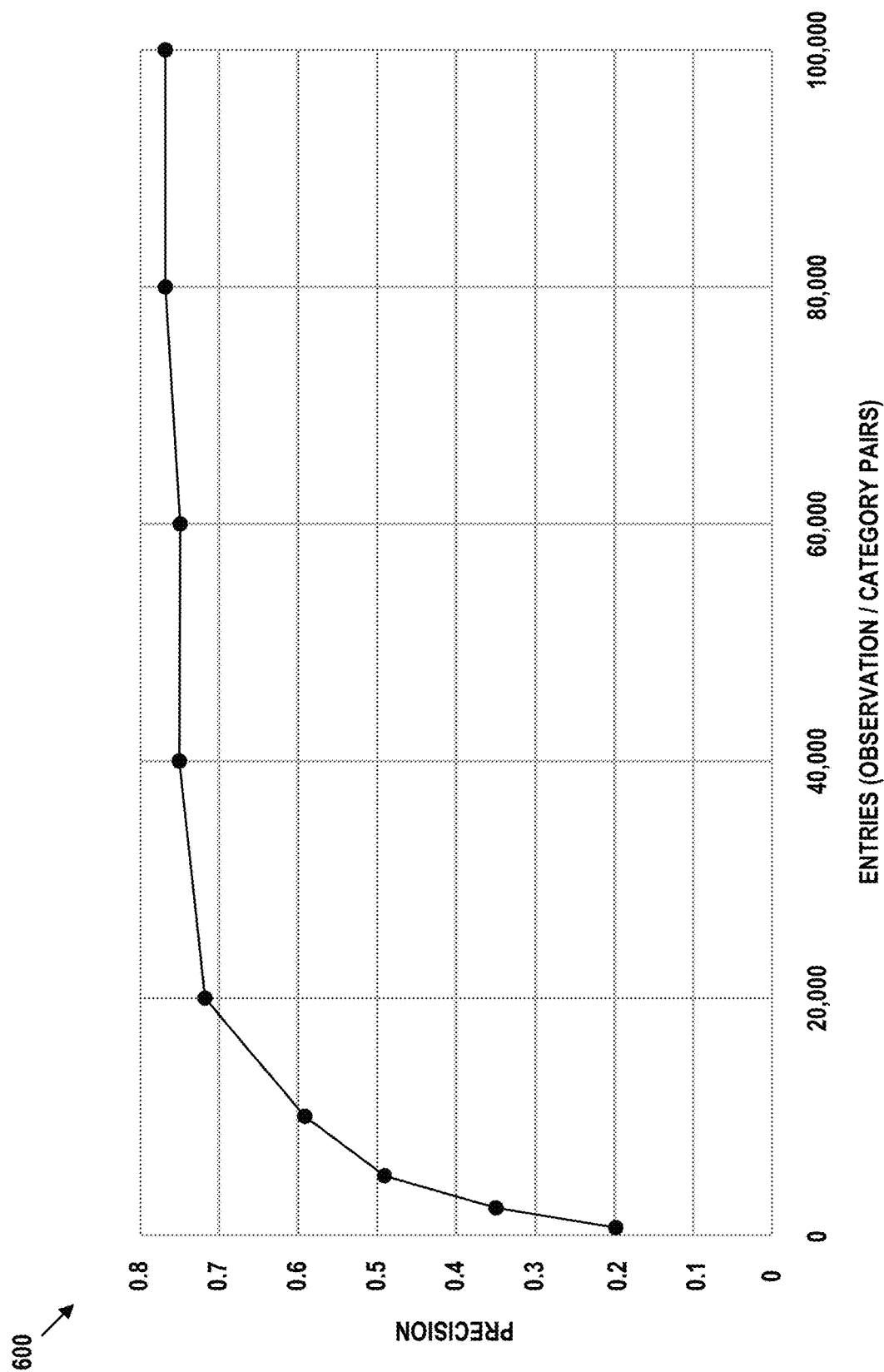
FIG. 6 is a graph, in accordance with example embodiments.

FIG. 6 illustrates an example of this phenomenon. It is assumed that there is a corpus of training data that includes a number of entries, where each entry is an observation that is respectively paired with it ground truth category, not unlike the pairings in Table 1. Assuming for the moment that the entire corpus is to be used to train a classifier, the size of the corpus (i.e., the number of entries) may have a significant impact on model quality.

For example, graph 600 plots corpus size on the x-axis versus precision of the classifier on the y-axis, wherein the precision is calculated based on the performance of the classifier when trained with a specified corpus size. For example, when trained with a corpus size of only 1,000 entries, the resulting classifier has a precision of about 20%. This precision generally grows with corpus size—for a corpus size of 5,000 entries, the precision is 49% and for a corpus size of 10,000 entries, the precision is 59%.

Nonetheless, increasing the corpus size beyond about 20,000 entries (which results in a classifier with a precision of 72%) does little to increase precision. To that point, a corpus size of 40,000 entries results in a precision of 75% and a corpus size of 100,000 entries results in a precision of 77%. Thus, the point of diminishing returns, in this particular example, is reached with a corpus size of about 20,000 entries.

It is desirable to identify such a point because as the size of the corpus used to train a classifier increases, the amount of time required for the training to complete increases as well. Therefore, it would be inefficient to train a classifier with more data than is necessary to achieve satisfactory results. As a consequence, one might conclude from graph 600 that there is no meaningful advantage to training the classifier with more than 20,000 entries.

Further, it is helpful for the user to be able to understand the classifier's highest achievable precision given its input data. For example, a particular classifier might only be able to attain a maximum precision of 60% no matter the size of the corpus. It is helpful to know when this is the case, because otherwise the user might waste a significant amount of time and processing power training the classifier with larger and larger corpuses to no avail.

Figure 7:
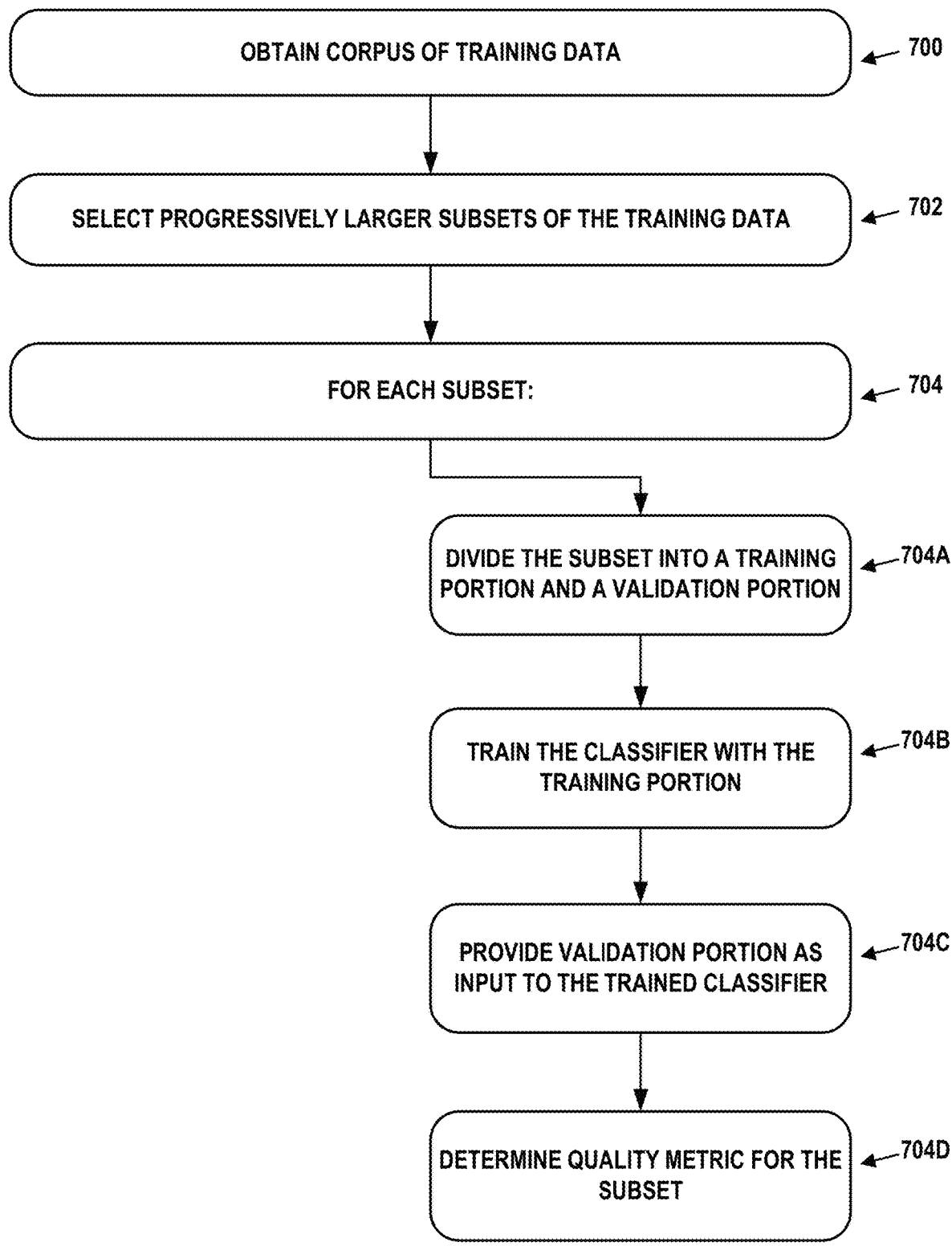
FIG. 7 is a flow chart, in accordance with example embodiments.

In order to determine the relative quality of the classifier when it is trained with various amounts of data, the procedure illustrated in FIG. 7 may be used. Particularly, block 700 may involve obtaining a corpus of training data. As noted above, the corpus may include some number of entries, with each entry containing an observation and a ground truth category for that observation.

Block 702 may involve selecting progressively larger subsets of the training data. These subsets may be selected in various ways. For instance, the number of entries per subset may increase by some fixed amount (e.g., by 10,000 entries) or a percentage of the total number of entries in the corpus (e.g., by 10%). As an example, subset sizes may be selected in increments of 10% starting at 5%. Thus, these subsets may include, of the total number of entries, 5%, 15%, 25%, . . . , 85%, and 95%. Also, the subsets might not be chosen in a purely linear fashion. For example, after some extent of subsets is selected, more subsets of various sizes may be selected in order to focus on a particular range of subset sizes (as discussed below).

Block 704 may involve performing a series of steps for each subset. At block 704A, the current subset is divided into a training portion and a validation portion. For example, the training portion may be 80% of the entries in the subset, while the validation portion may be the remaining 20%. But these values may vary.

The portions are used for cross-validation of the classifier. Thus, block 704B may involve training the classifier with the training portion, and block 704C may involve providing the observations from the validation portion as input to the trained classifier. The resulting output may include categorization of each of these observations. Block 704D may involve, by comparing this categorization to the ground truth categories of the observations from the validation portion, determining a quality metric for the subset. The quality metric may be precision or some other metric.

Once a quality metric has been calculated for each subset, the subsets can be qualitatively compared. One way of doing so is by way of a graph, such as graph 600. From this graph, a subset size may be recommended. As noted previously, this subset size may be the point of diminishing returns in terms of the quality metric (e.g., a subset size of 20,000 entries as shown on graph 600).

There are several ways in which this subset size can be selected. For instance, the recommended subset size may be the smallest subset that has a quality metric that is no more than a pre-determined amount from either (i) the highest quality metric for any of the subsets, or (ii) the quality metric for the full corpus. As an example, suppose that the criteria for recommending a subset size for the scenario of FIG. 6 is to select the smallest subset of all subsets that have a quality metric no more than 5% less than that of the full corpus. Since the full corpus has a precision of 77%, the only candidates are the subset sizes of 20,000 entries, 40,000 entries, 60,000 entries, and 80,000 entries. Of these, the subset with 20,000 entries is the smallest subset and would therefore be recommended. Other embodiments are possible.

In some cases, this recommendation may be provisional. In other words, once the recommended subset size is found, one or more additional subsets with sizes within a pre-determined range of that of the provisional recommendation may be cross-validated in accordance with blocks 704A-704D. This way, it may be possible to find an even smaller subset size that meets the recommendation criteria. Continuing with the example from FIG. 6, once the subset size of 20,000 entries is provisionally recommended, subset sizes of 18,000 and 16,000 may be tested to see if they exhibit a precision no less than 5% below that of the full corpus. If this is the case, the provisional recommendation may be replaced with a recommendation for the smallest such subset. This process of fine-tuning recommendations may continue until no more subsets meeting the criteria can be found or until some other stopping condition is reached.

When the recommended subset size is determined, subsets of that size may be used to train the classifier going forward. For example, if a classifier is scheduled to be trained once a week or once a month, a number of entries of the subset size may be selected (e.g., randomly) from the corpus. These entries, instead of all entries in the corpus, may be used to train the classifier for production operation. In this way, computational requirements are reduced, and a high-quality classifier can be produced using less time and resources.

While the mechanisms described above can be used to automatically determine a desirable number of entries of training data for a classifier, the quality metric (e.g., precision) is applied to all entries. Thus, the quality metric should be viewed as an aggregate evaluation of classifier quality across all categories. But in some situations, it may be desirable to consider per-category quality metrics for at least some categories.

For example, consider the IT help desk trouble ticket scenario discussed in the context of Table 1. Suppose that the possible categories to assign to tickets include authentication, backup, chat, database, email hardware, Internet access, mobile, network, user interface, and VPN. Of these categories, some may be more important to the user than others. For instance, the user may be more concerned about email and VPN problems than those of any other category (or the aggregate of all categories). Therefore, the recommendation of a subset size may take into account the importance of one or more categories.

Figure 8A:
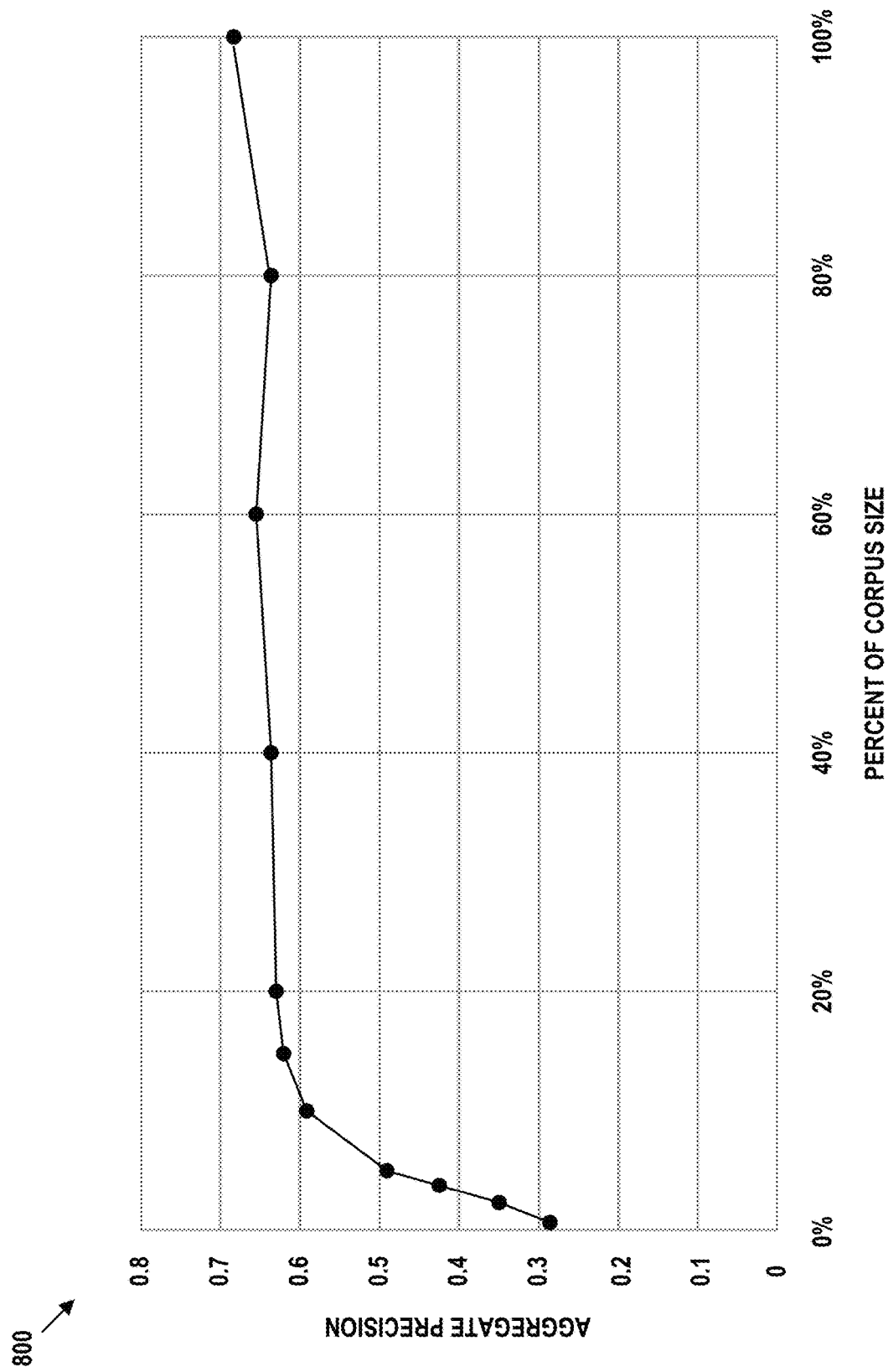
FIG. 8A is a graph, in accordance with example embodiments.

As a more concrete example, FIG. 8A depicts the precisions of a number of different subsets selected from a corpus of training data. The x-axis of graph 800 plots the number of entries in each subset as a percentage of the total number of entries in the corpus. The y-axis of graph 800 plots aggregate precision of the respective subsets. Here, the aggregate precision represents the precision measured across all categories.

Based just on the data in graph 800, one might determine that a classifier trained with the entire corpus has a precision of 68%, and a classifier trained with the subset consisting of 20% of the corpus has a precision of 63%. Thus, using the recommendation criteria discussed above, this subset may be recommended for use in training the classifier for production use (i.e., all subsets with fewer than 20% of the entries from the corpus have a significantly lower precision). Nonetheless, this limited view of the training data might not be the best representation to consider if the user is primarily interested in obtaining a high precision for classification of email and VPN problems.

Figure 8B:
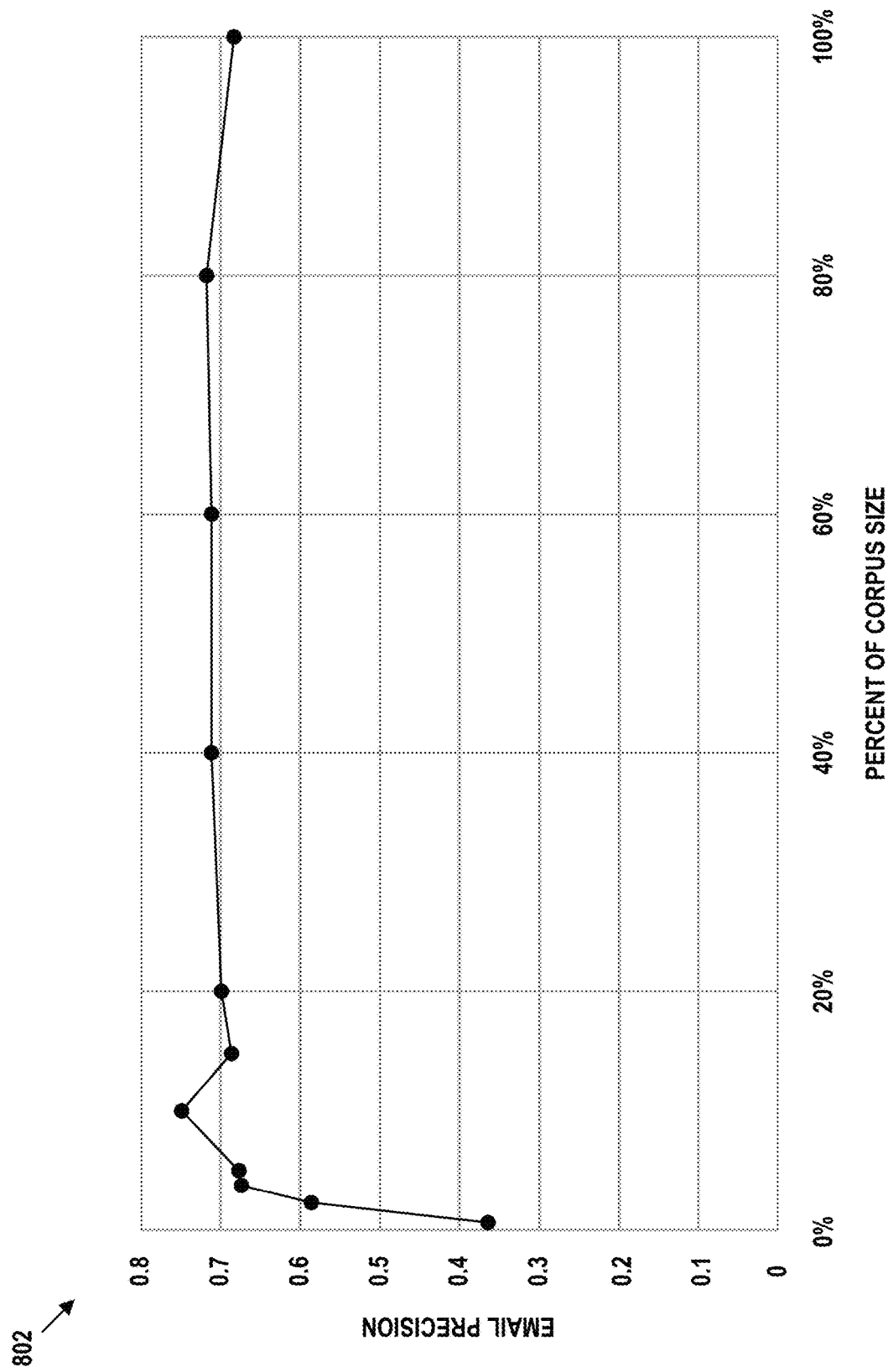
FIG. 8B is a graph, in accordance with example embodiments.

FIG. 8B also depicts the precision of a number of different subsets selected from a corpus of training data. Not unlike FIG. 8A, the x-axis of graph 802 plots the number of entries in each subset as a percentage of the total number of entries in the corpus. But the y-axis of graph 802 plots precision of the classifier only with respect to the email category. Thus, the precisions shown in FIG. 8B are calculated based on the number of observations correctly classified as email-related out of all observations with a ground truth category of email.

Based on the data in graph 802, one might determine that the entire corpus has a precision of 68% and the subset consisting of 3% of the corpus has a precision of 66%. Thus, using the criteria discussed above, this subset may be recommended for use in training the classifier (i.e., all subsets with fewer than 3% of the entries from the corpus have a significantly lower precision). This example also demonstrates that some types of observations provide significantly better results than others when training a classifier with a relatively small amount of data.

Figure 8C:
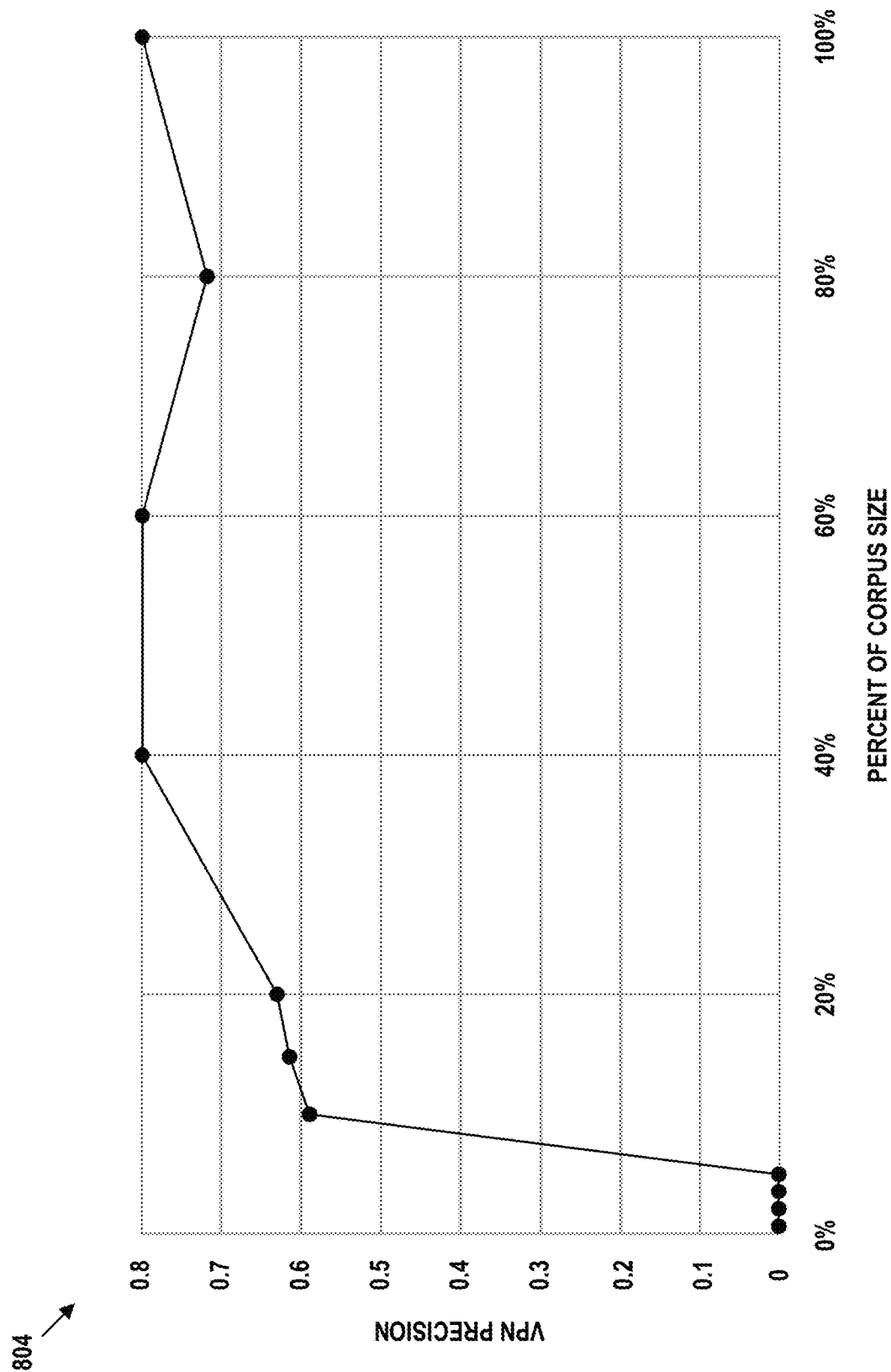
FIG. 8C is a graph, in accordance with example embodiments.

FIG. 8C also depicts the precision of a number of different subsets selected from a corpus of training data. Not unlike FIG. 8A, the x-axis of graph 804 plots the number of entries in each subset as a percentage of the total number of entries in the corpus. But the y-axis of graph 804 plots precision of the classifier only with respect to the VPN category. Thus, the precisions shown in FIG. 8C are calculated based on the number of observations correctly classified as VPN-related out of all observations with a ground truth category of VPN.

Based on the data in graph 804, one might determine that the entire corpus has a precision of 80% and the subset consisting of 40% of the corpus also has a precision of 80%. Thus, using the criteria discussed above, this subset may be recommended for use in training the classifier (i.e., all subsets with fewer than 40% of the entries from the corpus have a significantly lower precision). This example also demonstrates that some types of observations provide significantly poorer results than others when training a classifier with a relatively small amount of data.

Should the user be interested in both email and VPN precision, the system might recommend training the classifier with 40% of the corpus. While a reasonably high email precision can result from training the classifier with only 3% of the data, much more data might be required for VPN precision to be similarly high with respect to the corpus as a whole. In general, if the user is interested the precision of the classifier across multiple specific categories, the largest subset size from the recommended subset sizes for each of these categories may be used.

The information shown in FIGS. 8A, 8B, and 8C, as well as related types of information, may be displayed in an interactive GUI. Among other options, the GUI may include a control to select one or more categories. Based on the category(s) selected, the GUI may display a subset size versus precision graph for these category(s). In some cases, these graphs may be displayed next to or with another graph plotting subset size versus precision for the entire corpus. Other options are possible.

Advantageously, the embodiments herein facilitate automatic recommendation of an amount of training data to be used to train a classifier. The amount is selected to be the smallest such amount that provides a quality (e.g., precision) that is within a pre-defined range from the quality of a classifier trained with more data. As a consequence of training the classifier with the recommended amount of data, less training time is required, computational cycles are reduced, and redundancy is eliminated.

VII. EXAMPLE OPERATIONS

Figure 9:
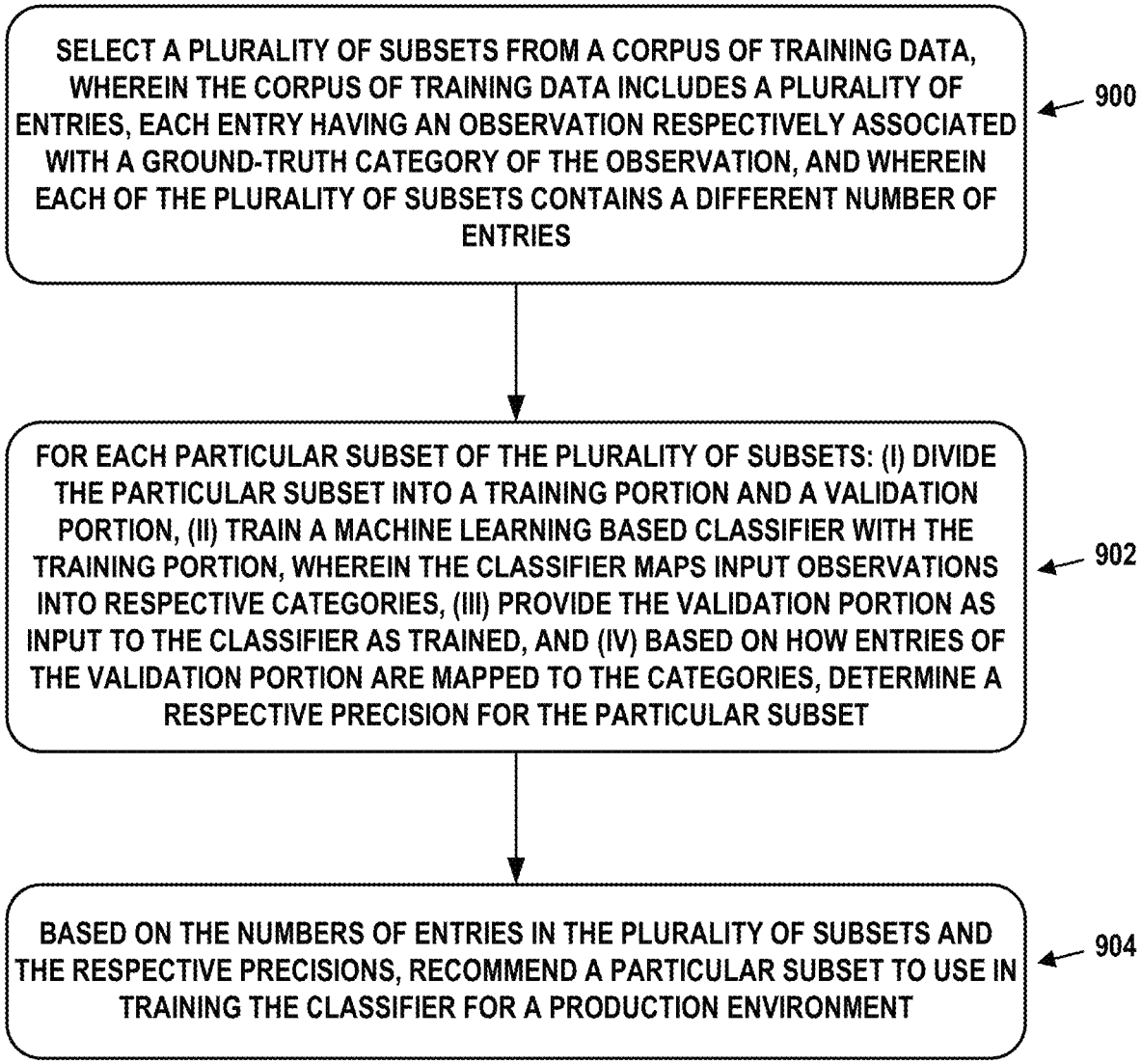
FIG. 9 is a flow chart, in accordance with example embodiments.

FIG. 9 is a flow chart illustrating an example embodiment. The process illustrated by FIG. 9 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 9 may be simplified by the removal of any one or more of the features shown therein. Further, these embodiments may be combined with features, aspects, and/or implementations of any of the previous figures or otherwise described herein.

Block 900 may involve selecting, by a computing device, a plurality of subsets from a corpus of training data, where the corpus of training data includes a plurality of entries, each entry having an observation respectively associated with a ground truth category of the observation, and where each of the plurality of subsets contains a different number of entries.

Block 902 may involve, for each particular subset of the plurality of subsets, the computing device: (i) dividing the particular subset into a training portion and a validation portion, (ii) training a machine learning based classifier with the training portion, wherein the classifier maps input observations into respective categories, (iii) providing the validation portion as input to the classifier as trained, and (iv) based on how entries of the validation portion are mapped to the categories, determining a respective precision for the particular subset.

Block 904 may involve, possibly based on the numbers of entries in the plurality of subsets and the respective precisions, recommending, by the computing device, a particular subset to use in training the classifier for a production environment. Here, a production environment may refer the any computational setting in which the trained classifier is used to classify new data. Placing a classifier trained for categorization of IT help desk trouble tickets in a computational instance associated with an enterprise generating such trouble tickets is an example of deploying the classifier to a production environment.

In some embodiments, the respective precision for the particular subset is calculated as the percentage of all entries of the validation portion that were mapped to their ground truth categories. Alternatively or additionally, the respective precision for the particular subset is calculated as the percentage of entries of the validation portion associated with a particular ground truth category that were mapped to the particular ground truth category.

In some embodiments, a largest subset of the plurality of subsets includes all of the entries in the corpus and has a particular precision. Recommending the particular subset to use in training the classifier for the production environment may involve: (i) determining, from the plurality of subsets, one or more subsets that have precisions that are no more than a pre-determined amount lower than the particular precision, and (ii) recommending, from the one or more subsets, a subset with a smallest number of entries.

In some embodiments, a specific subset of the plurality of subsets includes all of the entries in the corpus and has a highest precision of any of the plurality of subsets. Recommending the particular subset to use in training the classifier for the production environment may involve: (i) determining, from the plurality of subsets, one or more subsets that have precisions that are no more than a pre-determined amount lower than the highest precision, and (ii) recommending, from the one or more subsets, a subset with a smallest number of entries.

Some embodiments may further involve training the classifier using the recommended subset, and deploying the classifier as trained into the production environment.

Some embodiments may further involve generating, for display on a GUI of a client device, a representation of a graph that plots the number of entries in each of the plurality of subsets versus the respective precision for each of the plurality of subsets. The representation of the graph may plot the number of entries in each of the plurality of subsets on the x-axis and plot the respective precision for each of the plurality of subsets on the y-axis.

The graphical user interface may allow selection of one or more of the categories. To that point, some embodiments may involve, possibly in response to receiving a selection of any of the categories, generating, for display on the graphical user interface, a second representation of a second graph that plots the number of entries in each of the plurality of subsets versus the respective precision of the category for each of the plurality of subsets.

VIII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising:
a machine learning based classifier that maps input observations into respective categories, wherein the observations include textual descriptions of problems related to information technology usage, and wherein the categories include types of problems related to information technology usage; and
a computing device configured to:
select a plurality of subsets of training data from a corpus of the training data, wherein the corpus of the training data includes a plurality of entries, each entry having an observation respectively associated with a ground truth category of the observation, and wherein each subset of the plurality of subsets of the training data contains a different number of entries;
for each subset of the plurality of subsets of the training data: (i) divide the subset into a training portion and a validation portion, (ii) train the classifier with the training portion, (iii) provide the validation portion as input to the classifier as trained, and (iv) based on how entries of the validation portion are mapped to the categories, determine a respective precision for the subset, wherein a largest subset of the plurality of subsets includes all of the entries in the corpus and has a particular precision;

determine, from the plurality of subsets, one or more subsets that have respective precisions that are no more than a pre-determined amount lower than the particular precision; and recommend, from the one or more subsets, a particular subset having a smallest number of entries to use in training the classifier for a production environment.

2. The computing system of claim 1, wherein the respective precision for the subset is calculated as a percentage of all entries of the validation portion that were mapped to their ground truth categories.

3. The computing system of claim 1, wherein the respective precision for the subset is calculated as a percentage of entries of the validation portion associated with a particular ground truth category that were mapped to the particular ground truth category.

4. The computing system of claim 1, wherein the computing device is configured to:

train the classifier using the recommended particular subset of the plurality of subsets of the training data; and deploy the classifier as trained into the production environment.

5. The computing system of claim 1, wherein the largest subset has a highest precision of any of the plurality of subsets of the training data, and wherein the computing device is configured to:

determine, from the plurality of subsets of the training data, one or more particular subsets that have precisions that are no more than a particular pre-determined amount lower than the highest precision; and recommend, from the one or more particular subsets, a subset with a smallest number of entries.

6. The computing system of claim 1, wherein the computing device is configured to generate, for display on a graphical user interface of a client device, a representation of a graph that plots the number of entries in each of the plurality of subsets of the training data versus the respective precision for each of the plurality of subsets of the training data, and wherein the representation of the graph plots the number of entries in each of the plurality of subsets of the training data on an x-axis and plots the respective precision for each of the plurality of subsets of the training data on a y-axis.

7. The computing system of claim 1, wherein the computing device is configured to generate, for display on a graphical user interface of a client device, a representation of a graph that plots the number of entries in each of the plurality of subsets of the training data versus the respective precision for each of the plurality of subsets of the training data, wherein the graphical user interface allows selection of one or more of the categories, and wherein the computing device is configured to:

in response to receiving a selection of any of the categories, generate, for display on the graphical user interface, a second representation of a second graph that plots the number of entries in each of the plurality of subsets of the training data versus the respective precision of the category for each of the plurality of subsets of the training data.

8. The computing system of claim 1, wherein the computing system is disposed within a computational instance of a remote network management platform, and wherein the computational instance is configured to remotely manage a particular managed network.

9. A computer-implemented method comprising:

selecting, by a computing device, a plurality of subsets of training data from a corpus of the training data, wherein the corpus of the training data includes a plurality of entries, each entry having an observation respectively associated with a ground truth category of the observation, wherein each of the observations includes a textual description of a problem related to information technology usage, wherein the ground truth category include a type of problems related to information technology usage, and wherein each of the plurality of subsets of the training data contains a different number of entries;

for each subset of the plurality of subsets of the training data, the computing device: (i) dividing the subset into a training portion and a validation portion, (ii) training a machine learning based classifier with the training portion, wherein the classifier maps input observations into respective categories, (iii) providing the validation portion as input to the classifier as trained, and (iv) based on how entries of the validation portion are mapped to the categories, determining a respective precision for the subset, wherein a largest subset of the plurality of subsets includes all of the entries in the corpus and has a particular precision;

determining, by the computing device, from the plurality of subsets, one or more subsets that have respective precisions that are no more than a pre-determined amount lower than the particular precision; and recommending, by the computing device, from the one or more subsets, a particular subset having a smallest number of entries to use in training the classifier for a production environment.

10. The computer-implemented method of claim 9, wherein the respective precision for the subset is calculated as a percentage of all entries of the validation portion that were mapped to their ground truth categories.

11. The computer-implemented method of claim 9, wherein the respective precision for the subset is calculated as a percentage of entries of the validation portion associated with a particular ground truth category that were mapped to the particular ground truth category.

12. The computer-implemented method of claim 9, wherein the largest subset has a highest precision of any of the plurality of subsets of the training data, and comprising:

determining, from the plurality of subsets, one or more particular subsets that have precisions that are no more than a particular pre-determined amount lower than the highest precision; and recommending, from the one or more particular subsets, a subset with a smallest number of entries.

13. The computer-implemented method of claim 9, comprising:

training the classifier using the particular subset of the plurality of subsets of the training data; and deploying the classifier as trained into the production environment.

14. The computer-implemented method of claim 9, comprising:

generating, for display on a graphical user interface of a client device, a representation of a graph that plots the number of entries in each of the plurality of subsets of the training data versus the respective precision for each of the plurality of subsets of the training data.

15. The computer-implemented method of claim 14, wherein the representation of the graph plots the number of entries in each of the plurality of subsets of the training data on an x-axis and plots the respective precision for each of the plurality of subsets of the training data on a y-axis.

16. The computer-implemented method of claim 14, wherein the graphical user interface allows selection of one or more of the categories, the method comprising:

in response to receiving a selection of any of the categories, generating, for display on the graphical user interface, a second representation of a second graph that plots the number of entries in each of the plurality of subsets of the training data versus the respective precision of the category for each of the plurality of subsets of the training data.

17. An article of manufacture including a non-transitory computer-readable medium, having stored thereon program instructions that, upon execution by a computing system, cause the computing system to perform operations comprising:

selecting a plurality of subsets of training data from a corpus of the training data, wherein the corpus of the training data includes a plurality of entries, each entry having an observation respectively associated with a ground truth category of the observation, wherein each of the observations includes a textual description of a problem related to information technology usage, wherein the ground truth category include a type of problems related to information technology usage, and wherein each of the plurality of subsets of the training data contains a different number of entries;

for each subset of the plurality of subsets of the training data: (i) dividing the subset into a training portion and a validation portion, (ii) training a machine learning based classifier with the training portion, wherein the classifier maps input observations into respective categories, (iii) providing the validation portion as input to the classifier as trained, and (iv) based on how entries of the validation portion are mapped to the categories, determining a respective precision for the subset, wherein a largest subset of the plurality of subsets includes all of the entries in the corpus and has a particular precision;

determining, from the plurality of subsets, one or more subsets that have respective precisions that are no more than a pre-determined amount lower than the particular precision; and recommending, from the one or more subsets, a particular subset having a smallest number of entries to use in training the classifier for a production environment.

* * * * *